(No Model.)
O. M. KNOX.
WIRE HOLDER FOR HOP VINE SUPPORTS.
No. 356,139. Patented Jan. 18, 1887.
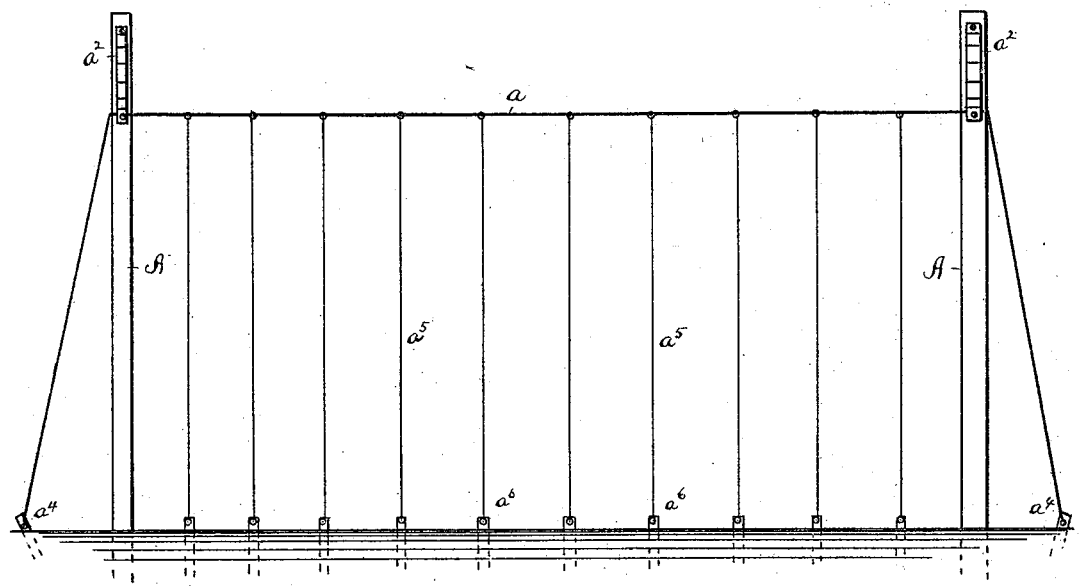
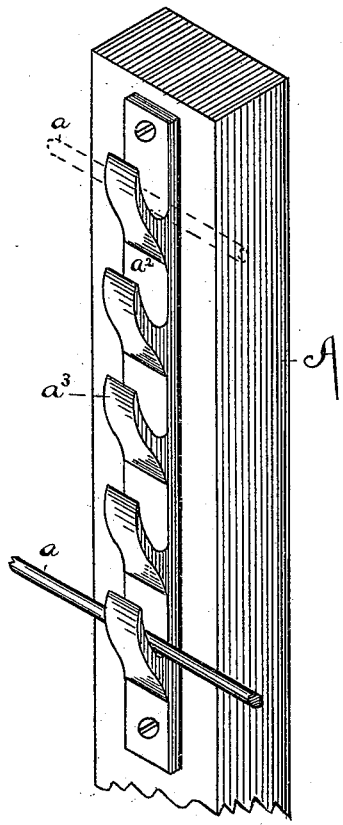
WITNESSES:
INVENTOR.
BY
ATTORNEYS.

UNITED STATES PATENT OFFICE.

ORVILLE M. KNOX, OF MADISON, NEW YORK.

WIRE-HOLDER FOR HOP-VINE SUPPORTS.

SPECIFICATION forming part of Letters Patent No. 356,139, dated January 18, 1887.

Application filed February 24, 1886. Serial No. 192,994. (No model.)

*To all whom it may concern:*

Be it known that I, ORVILLE M. KNOX, of Madison, in the county of Madison and State of New York, have invented certain new and useful Improvements in Wire-Holders for Hop-Vine Supports; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in vine-supports; and it consists in the mechanism hereinafter described and claimed.

In the accompanying drawings, Figure 1 represents the twine, wire, end supports with my improvements applied. Fig. 2 represents a post or support in section, with my improved metallic notched support attached.

Heretofore producers of hops and analogous plants which are trained on poles or cords and wires have experienced great difficulty in using cords and wires as a means of training and supporting the vines, in consequence of the great tendency in the supporting-wire to sag. I overcome this tendency in the wire to sag by providing a notched metallic strip, which is attached to the supporting-posts on which the wires are strung, by means of which the wire may be raised one or more notches, thereby overcoming the slack which would otherwise exist in a supporting-wire.

In the drawings, A A represent the posts or end supports, which are placed in the ground at the end of the rows of hops or other plants, and are provided for supporting the wires. Upon the upper portion of each supporting-post I provide a notched metallic strip having one or more notches of sufficient size and strength to support the wire. These strips are rigidly attached to the supporting-posts at suitable height. $a^2$ $a^2$ represent notched metallic strips of my improved construction. $a^3$ represents the projecting notches on the strip. I then provide a wire or cable, $a$, of sufficient size and strength, which is placed in the lower notches in the metallic strip on the supporting-posts, and is attached to stakes $a^4$ $a^4$, driven or anchored in the ground outside of the supporting-posts. The wire or cable is then made taut. I then provide connecting-cords $a^5$, the lower end being attached to a peg or stake, $a^6$, which is driven into the ground, and the upper end is attached to the wire or cable $a$. As the vines climb these connecting cords and pass over the supporting wire or cable, I raise the supporting-cable in the notched metallic strips attached to the supporting-posts, which may be accomplished by using a pole, whereby the supporting wire or cable may be raised and suspended sufficiently high on the notches to take up all the slack that may be produced by the load on the cords and cables by the vines in the process of growth and development.

I am aware that projecting points formed of non-electric conducting material have been used for supporting electric conductors, and I am also aware that plates having projections have been used for tightening sails. I disclaim both constructions; but, so far as I am aware, notched metallic strips used for supporting wires or cables as a means of supporting, elevating, and tightening supports for vines, I claim the same is new.

What I claim as new, and desire to secure by Letters Patent, is—

The cable secured at its extremities and elevated and supported by the upright posts having the notched metallic strips, in combination with the cords secured at their upper ends to the cable and having their lower ends anchored to the ground, all constructed and combined to operate substantially as set forth, and for the purposes stated.

In witness whereof I have affixed my signature in presence of two witnesses.

ORVILLE M. KNOX.

Witnesses:
EDWIN H. RISLEY,
L. F. STUART.